(No Model.)     S. W. HOAG, Sr.     3 Sheets—Sheet 1.
VALVE.

No. 272,879.     Patented Feb. 27, 1883.

Witnesses:
Walter E. Lombard
E. A. Hemmenway

Inventor:
Sidney W. Hoag Sr.
by N. C. Lombard
Attorney.

(No Model.) 3 Sheets—Sheet 2.
S. W. HOAG, Sr.
VALVE.

No. 272,879. Patented Feb. 27, 1883.

Witnesses:
Walter E. Lombard.
E. A. Hemmenway.

Inventor:
Sidney W. Hoag Sr.
by N. C. Lombard
Attorney.

(No Model.) 3 Sheets—Sheet 3.
S. W. HOAG, Sr.
VALVE.
No. 272,879. Patented Feb. 27, 1883.
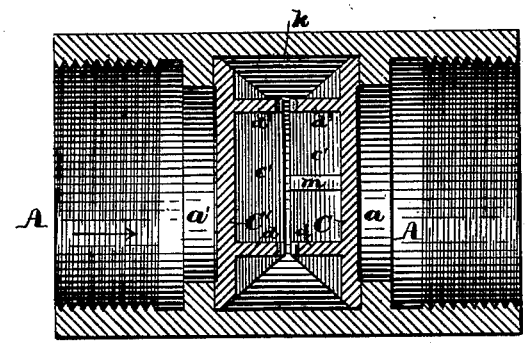
Fig. 7.
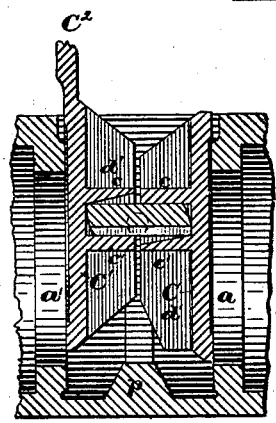
Fig. 6.
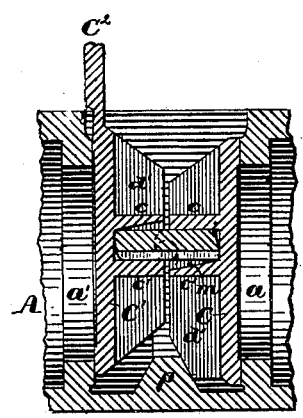
Fig. 5.
Fig. 10.
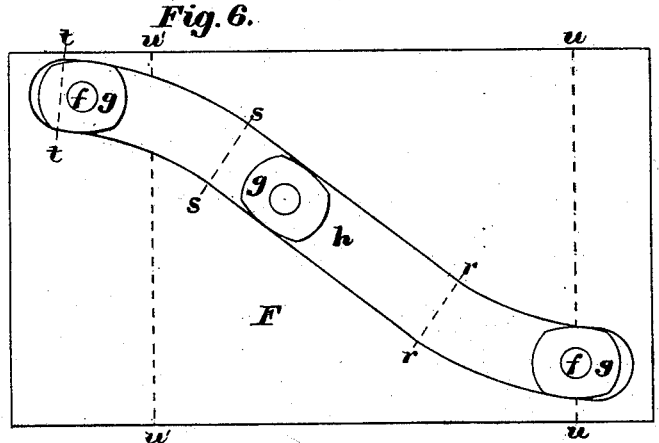
Fig. 11.
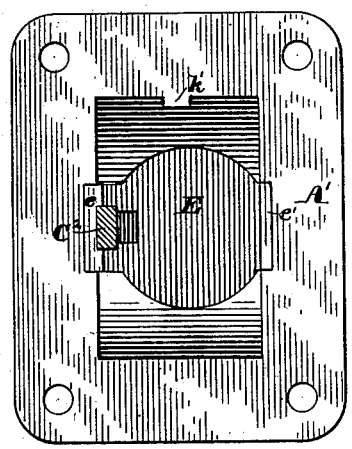
Fig. 8.
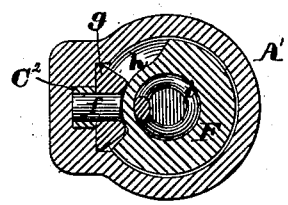
Fig. 9.
Witnesses:
Walter E. Lombard
E. A. Hemmenway
Inventor:
Sidney W. Hoag, Sr.
by N. C. Lombard
Attorney.

UNITED STATES PATENT OFFICE.

SIDNEY W. HOAG, SR., OF NEW YORK, N. Y., ASSIGNOR OF THREE-FOURTHS TO HENRY B. PIPER, OF SAME PLACE.

VALVE.

SPECIFICATION forming part of Letters Patent No. 272,879, dated February 27, 1883.

Application filed May 29, 1882. (No model.)

*To all whom it may concern:*

Be it known that I, SIDNEY W. HOAG, Sr., of New York, in the county of New York and State of New York, have invented certain new and useful Improvements in Valves, of which the following, taken in connection with the accompanying drawings, is a specification.

My invention relates to that class of valves called "straight-way valves," and has for its object greater simplicity of construction, greater speed of operation, more perfect seating of the valve, and consequent greater durability; and it consists in details of construction, which will be best understood by reference to the description of the drawings and to the claims to be hereinafter given.

Figure 1:
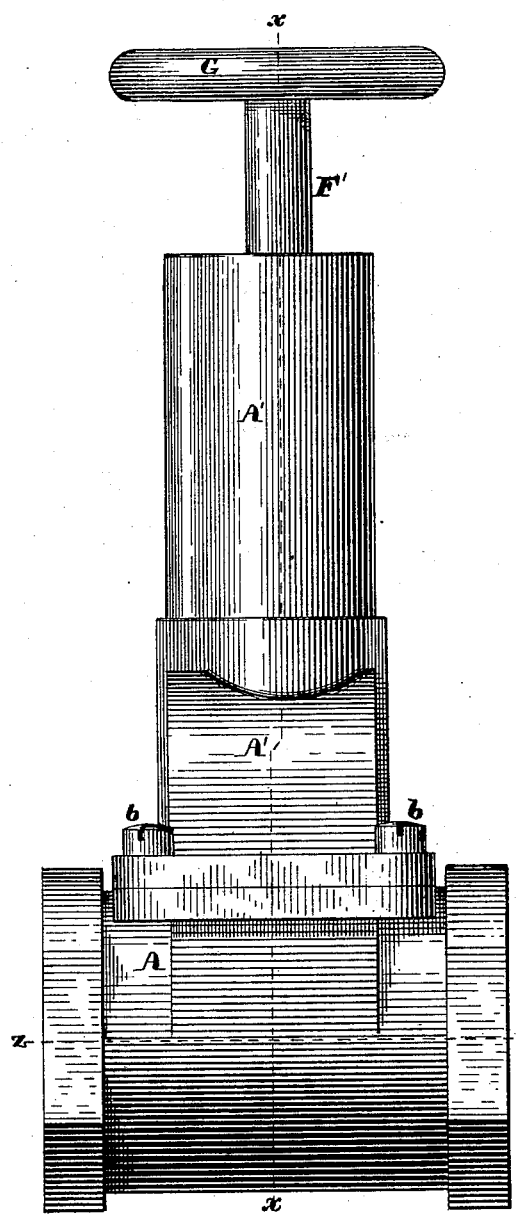
Figure 2:
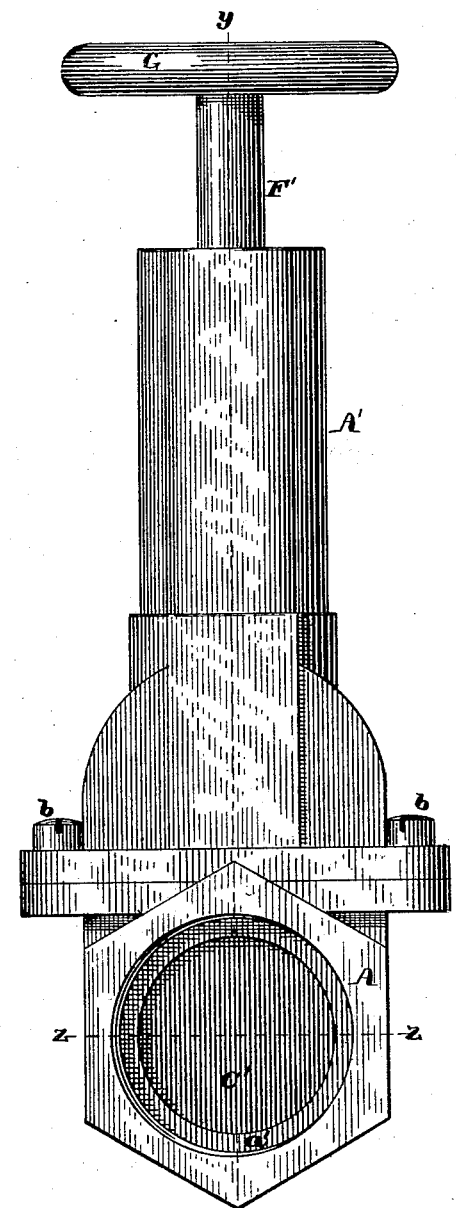
Figure 4:
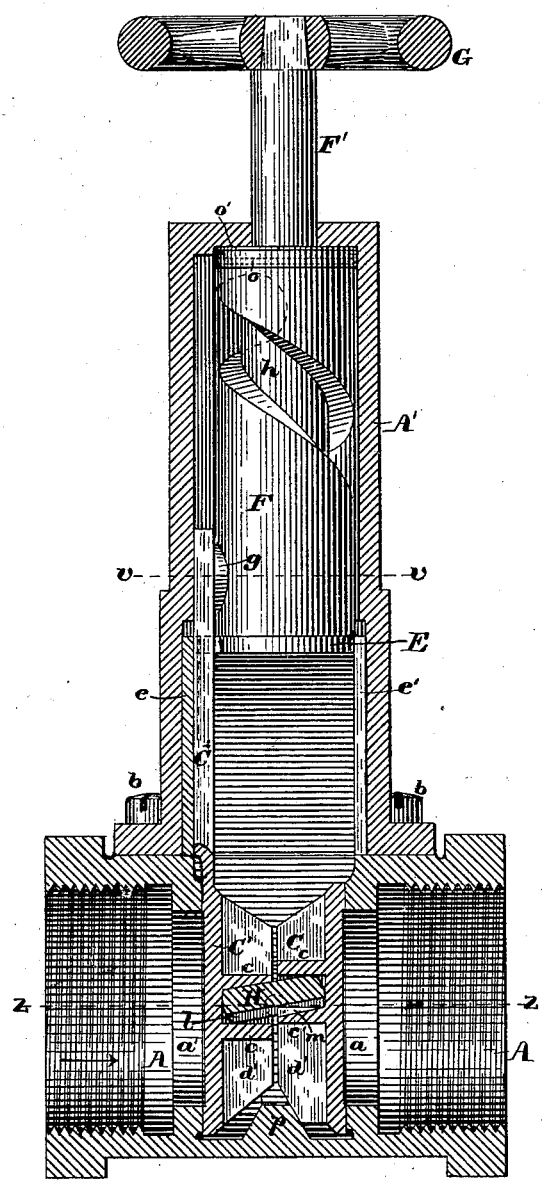
Figure 3:
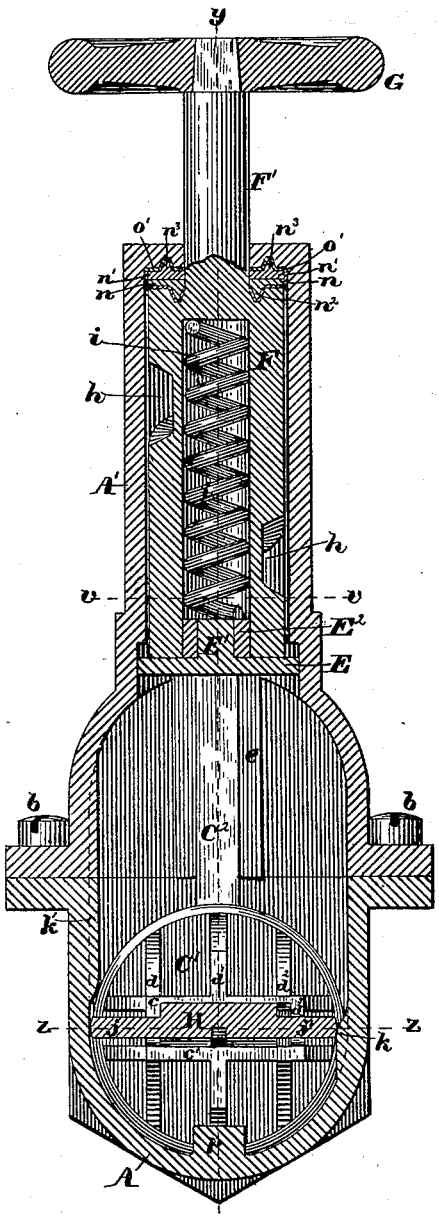

Figure 1 of the drawings is a side elevation of a valve embodying my invention. Fig. 2 is an end elevation of the same. Fig. 3 is a vertical section on line $x$ $x$ on Fig. 1. Fig. 4 is a vertical section on line $y$ $y$ on Figs. 2 and 3, showing the valve closed tight. Fig. 5 is a partial vertical section on the same line with one of the valve-disks moved upward a short distance. Fig. 6 is a similar section with the other valve-disk moved upward to a point to begin the opening of the direct passage through the valve-casing. Fig. 7 is a horizontal section on line $z$ $z$ on Figs. 1, 3, and 4 with the toggle cam-bar removed. Fig. 8 is inverted plan of the bonnet and bridge. Fig. 9 is section on line $v$ $v$ on Figs. 3 and 4. Fig. 10 is an inverted plan of the toggle or cam bar, and Fig. 11 is a projection of the cam-path for operating the valves upon a flat plane.

A is the body of the valve-casing, threaded at each end, as shown, to receive the connecting-pipes, and provided with the valve-seats $a$ and $a'$, and A' is the bonnet or casing inclosing the cam-cylinder F, and secured with a steam-tight joint to the casing A by means of the bolts $b$ $b$, all as shown in Figs. 3, 4, 5, 6, and 7.

C and C' are two valve-disks, having their outer faces turned and ground to fit the seats $a$ and $a'$, respectively, steam-tight, and having formed upon their inner faces the ribs $c$, $c'$, $d$, $d'$, $d^2$, and $d^3$. The valve C' has formed thereon or secured thereto the valve stem or bar $C^2$, made preferably rectangular in cross-section and extending upward from said valve, and guided by grooves formed in the leg $e$ of the bridge E and in the wall of the bonnet A', as shown in Figs. 3, 4, 8, and 9.

In the upper end of the stem $C^2$ is set the pin $f$, which carries the block $g$, shaped as shown in Figs. 9 and 11, with which the spiral groove or path $h$ in the periphery of the cylinder F engages in such a manner that by rotating said cylinder the valves C and C' may be raised or depressed at will.

The cylinder F is provided with a shank, F', which projects upward through the bonnet A', and has secured thereto the wheel G, if desired, as a means of operating the same. The cylinder F is chambered out to receive the spring $i$, the purpose of which will presently appear, and has a bearing at its lower end upon the upper end of the hub, E', formed upon the upper side of the bridge E or upon the ring $E^2$, surrounding said hub, as shown in Fig. 3.

The bridge E is provided with the legs $e$ and $e'$, which are fitted to grooves in opposite sides of the bonnet A', and rest by their lower ends upon the casing A, as shown in Figs. 3, 4, and 8.

H is a toggle-link or cam-bar provided with journals or stems $j$ $j'$, projecting from opposite ends thereof and placed between the valve-disks C and C', the body of said toggle-link or cam-bar lying within the chamber or inclosure formed by the ribs $c$, $c'$, $d$, and $d^3$, while the stems $j$ $j'$ pass between the ribs $d$ and $d^3$ of the two disks, said ribs $d$ and $d^3$ being cut away sufficiently to permit such passage. By reference to Fig. 3 it will be seen that the body of the toggle or bar H is somewhat shorter than the length of the interior of the chamber inclosed by the ribs $c$, $c'$, $d$, and $d^3$, and when the valves are in their extreme lowest position said toggle or bar is moved to the extreme of said chamber in one direction by the cam-projection $k$, formed in the casing A, as shown in Figs. 3 and 7. The casing A also has formed therein, upon the side opposite to the cam $k$, the inwardly-projecting rib $k'$, extending from the top of said casing downward to a point nearly on a horizontal line with the upper extreme of the cam $k$, and terminating at its lower end in a curved cam-surface, as shown in Fig. 3, which, when the valves are raised by the rotation of the cam-cylinder F, moves the toggle or bar H toward the rib $d^3$.

The toggle H has cut transversely across its under side the groove $l$, as shown in Figs. 3 and 10. The under side of the rib $c$ of valve C and the upper side of the rib $c'$ of the valve C are made perpendicular to the faces of their respective disks, while the under side of the rib $c$ of the valve C' and the upper side of the rib $c'$ of the valve C are inclined to the faces of said disks, except a narrow portion of the rib $c'$ of the valve C, which is parallel with the lower surface of the rib $c$ on the same valve, said raised portion being shown at $m$ in Figs. 4 and 7, and made of a suitable width to enter and loosely fill the groove $l$ in the under side of the toggle H, as shown in Fig. 3. The toggle H is so formed in cross-section that its width is greater measured horizontally when in the position shown in Fig. 4 than when in the positions shown in Figs. 5 and 6.

The upper end of the cam-cylinder F and its stem F' are packed to prevent the escape of water, steam, or other material around said stem by means of the two metal washers $n$ and $n'$ and the packing-rings $o$ and $o'$, of leather, rubber, or other suitable flexible packing material. The metal washer $n$ has formed upon its under side an annular V-shaped rib, $n^2$, arranged to fit a correspondingly-shaped annular recess in the upper end of the cylinder F and force the packing $o$ into the same, as shown. The metal washer $n'$ has formed upon its upper side a similar V-shaped annular rib, $n^3$, which forces the packing $o'$ in a correspondingly-shaped groove formed in the upper part of the bonnet A'.

The packing $o$ is made of considerably larger diameter than the metal washer $n$, and has its outer edge turned upward in the form of a short cylinder, which extends above the joint between the metal disks $n$ and $n'$ to pack the same, as shown in Fig. 3. The tension of the spring $i$ tends to force the cam-cylinder F upward against the packing-washers $n$, $n'$, $o$, and $o'$, so as to insure a tight joint around the stem F', the metal washer $n$ and packing $o$ revolving with the cylinder when it is rotated, while the washer $n'$ and packing $o'$ remain stationary.

To insure the seating of the valve C as soon as it has reached its lowest position, the lug $p$ is formed in the lower part of the casing A, having an inclined side toward said valve, and against which the inclined surface of the rib $d'$ impinges, as shown in Fig. 4.

The operation of my invention is as follows: The parts being in the position shown in Figs. 3 and 4, if it is desired to open a passage through the casing A for the passage of water, steam, or other fluid under pressure, the cylinder F is turned upon its axis about one and one-sixth of a revolution, when the passage is wide open. The first movement of said cylinder causes the valve C' to be moved upward, carrying with it the side of the toggle H, which is in contact therewith, till the groove $l$ is released from the lug $m$ and said toggle has assumed a horizontal position, with its upper side in contact with the under side of the rib $c$ of the valve C, and the upper side of the rib $c'$ of the valve C' is in contact with the under side of the toggle, as shown in Fig. 5, when the pressure of the toggle H is removed from the valves, and a continuation of the rotation of the cylinder F will cause both valves to be moved upward together. During the first part of the upward movement of both valves together the journal or stem $j$ of the toggle H is acted upon by the cam-rib $k'$, which moves said toggle endwise till the groove $l$ is at one side of the lug $m$, instead of directly over it, in which position it is retained by the rib $k'$ until the valves are nearly closed, by which arrangement the valves C and C' are locked together in such a manner that they must move together till the valve C has nearly reached its seat. When the valve is opened the current of water or other fluid is in the direction indicated by the arrow, and, if it is desired to close the valve, the cylinder is rotated in the opposite direction, and both valves move together by virtue of being locked together, as above described, till the stem $j'$ of the toggle H comes in contact with the cam-lug $k$, when the toggle is moved endwise away from said lug $k$ till the groove $e$ is directly over the lug $m$, at which time the valve C has reached its lowest position and has been pressed against its seat $h$ by the combined action of the inclined side of the lug $p$ and the pressure of the fluid moving through the casing A. A continuation of the revolution of the cylinder F causes the valve C' to be moved still farther downward, carrying with it the contiguous edge of the toggle H, which forces the two valves apart and firmly against their respective seats, and effectually closing the passage through the casing A.

The path $h$ of the cam-cylinder F is made with a variable pitch, commencing at the lower end of said cylinder with a slow pitch, which gradually increases to the point $r$, remains uniform from $r$ to $s$, and diminishes from $s$ to $t$, as shown in Fig. 11, which represents the path unwound from the cylinder and laid out on a flat plane, the distance between the dotted lines $u$ and $u'$ on said Fig. 11 representing the circumference of the cylinder. By this construction of the cam an increase of power is obtained for starting the valves from their seats with a quicker motion afterward, which cannot be done with the ordinary screw.

I have limited my invention in this application to claims covering the specific constructions of parts shown, reserving the right to cover the broad idea of locking in a future application.

What I claim as new, and desire to secure by Letters Patent of the United States, is—

1. The toggle H, provided with the stems $j$ and $j'$ and the groove $l$, in combination with the valve-disks C and C', the lug $m$, the casing A, provided with the cams $k$ and $k'$, and mechanism for moving said valves vertically, substantially as described.

2. In a straight-way valve, the combination of the casing A, provided with the seats $a$ and $a'$, the valves C and C', connected together by the toggle H, the valve-stem $C^2$, the block $g$, and the cylinder F, provided with the cam-path $h$, all arranged and adapted to operate substantially as and for the purposes described.

3. The combination of the casing A, valves C and C', the latter provided with the stem $C^2$, the bonnet A', the bridge E, the cam-cylinder F, the block $g$, and the toggle H, all constructed, arranged, and adapted to operate substantially as described.

4. The combination of the casing A, bonnet A', bridge E, cam-cylinder F, metal washers $n$ and $n'$, packing-rings $o$ and $o'$, and the spring $i$, all arranged and adapted to operate substantially as described.

5. As a means of packing the end of a rotating shaft or cylinder, the combination of the washers $n$ and $n'$, provided with the annular V-shaped ribs $n^2$ $n^3$, respectively, correspondingly-shaped annular grooves formed in the opposing faces of the joint to be packed, and the two packing-rings $o$ and $o'$, constructed and arranged substantially as described.

6. The combination of the valve C, the toggle H, the valve C', provided with the stem $C^2$, the block $g$, and the cylinder F, provided with the path $h$, having a variable pitch, substantially as described.

7. In a straight-way valve, the cam-cylinder F, provided with the path $h$, in combination with the valve-stem $C^2$ and block $g$, as a means of operating the valve-disks, substantially as described.

In testimony whereof I have signed my name to this specification, in the presence of two subscribing witnesses, on this 24th day of May, A. D. 1882.

SIDNEY W. HOAG, SR.

Witnesses:
BENJAMIN P. FINNELL,
JOHN N. GROSHON.